United States Patent
Toyoda et al.

(10) Patent No.: US 7,974,015 B2
(45) Date of Patent: Jul. 5, 2011

(54) WIDE-ANGLE COMPOUND-EYE IMAGING DEVICE

(75) Inventors: Takashi Toyoda, Daito (JP); Yoshizumi Nakao, Daito (JP); Yoshimasa Imahori, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 149 days.

(21) Appl. No.: 12/398,512

(22) Filed: Mar. 5, 2009

(65) Prior Publication Data

US 2009/0225432 A1 Sep. 10, 2009

(30) Foreign Application Priority Data

Mar. 6, 2008 (JP) ................................. 2008-056805

(51) Int. Cl.
- *G02B 13/06* (2006.01)
- *G02B 13/04* (2006.01)
- *G02B 13/18* (2006.01)

(52) U.S. Cl. ......................... 359/725; 359/749; 359/711

(58) Field of Classification Search .................. 359/725, 359/749–753, 709–712, 668

See application file for complete search history.

(56) References Cited

U.S. PATENT DOCUMENTS

| | | | | |
|---|---|---|---|---|
| 3,283,653 | A | * | 11/1966 | Tokarzewski ................. 359/725 |
| 3,658,410 | A | * | 4/1972 | Willey ........................... 359/671 |
| 6,865,028 | B2 | * | 3/2005 | Moustier et al. .............. 359/725 |
| 2007/0242946 | A1 | | 10/2007 | Toyoda et al. |
| 2008/0013191 | A1 | * | 1/2008 | Togino et al. ................. 359/725 |
| 2010/0045774 | A1 | * | 2/2010 | Len et al. ......................... 348/36 |

FOREIGN PATENT DOCUMENTS

| JP | 2005-338505 | 12/2005 |
|---|---|---|
| JP | 2007-288569 | 11/2007 |

* cited by examiner

*Primary Examiner* — Jordan M. Schwartz
(74) *Attorney, Agent, or Firm* — Crowell & Moring LLP

(57) ABSTRACT

A center lens for collecting light in a center range and left/right lenses for collecting light in left/right ranges are supported in one plane to form center and left/right unit images. A microprocessor combines the unit images into a wide-angle image. The left/right optical lenses are placed on left-right direction line parallel to the wide-angle direction, while the center lens is placed distant from the left/right lenses above the direction line. Prisms are placed in front of the left/right lenses, and a toroidal lens to vertically modify the light path for light convergence onto each lens is placed in front of the prisms. The toroidal lens has a vertically curved surface having an axis coinciding with the direction line, and a horizontally cured surface having an axis coinciding with a vertical line passing through the center lens. This device can obtain a wide-angle image with a vertically large picture angle.

3 Claims, 5 Drawing Sheets kc kl

WIDE-ANGLE COMPOUND-EYE IMAGING DEVICE

BACKGROUND OF THE INVENTION

1. Field of the Invention

The present invention relates to a wide-angle compound-eye imaging device.

2. Description of the Related Art

A wide-angle compound-eye imaging device with a wide field of view is known in which light entering in a wide-angle capture range is collected by multiple optical lenses in predetermined divided or shared angular ranges in the direction from left to right in the wide field of view or wide-angle capture range (hereafter referred to simply as wide-angle direction), and unit images formed by the optical lenses in the respective angular ranges are combined into a wide-angle capture image as disclosed in e.g. Japanese Laid-open Patent Publication 2007-288569. In such compound-eye imaging device, the optical lenses are placed from left to right (left, center and right) in the wide-angle direction, while a prism is placed in front of each left and right optical lens to share each left and right angular range to bend a path of light entering in each left and right capture range. This allows that the optical lens used to share each left, center and right angular range has a capture range e.g. as small as 40° (degrees) so as to capture an image in a capture range of 120° (degrees) without distortion.

The compound-eye imaging device of this patent publication makes it possible to easily obtain a distortion-free wide-angle or panoramic image with a picture angle of maximum about 180° (degrees) from left to right in the wide-angle direction. However, the picture angle from up to down, which is in a direction perpendicular to the wide-angle direction, is limited by the capture angle (i.e. convergence angle) specific to each optical lens. For example, if each optical lens used has a specific capture angle of 40°, it is only possible to obtain an image with a picture angle as small as 40° from up to down in the direction perpendicular to the wide-angle direction. Note here that it is generally understood that the maximum allowable limit of the picture angle of an image to be captured by one optical lens without distortion is about 60°.

Thus, in order to allow each of the optical lenses to have a specific capture angle larger than 60° (degrees), each optical lens is required to be formed of a combined lens consisting of two or more lenses. However, in a compound-eye imaging device, each optical lens is normally formed very small (as small as a few millimeters, for example), so that the provision of the combined lens makes it difficult to manufacture the compound-eye imaging device, and increases its cost. If, on the other hand, each optical lens is formed large, the size or volume of the resultant compound-eye imaging device becomes large. This reduces the advantage of small size which the compound-eye imaging device basically has.

Besides, another compound-eye imaging device is known in which multiple optical lenses are used to form each unit image so as to allow respective unit images to be those with different picture angles as disclosed in e.g. Japanese Laid-open Patent Publication 2005-338505. However, this does not solve the problems described above.

SUMMARY OF THE INVENTION

An object of the present invention is to provide a wide-angle compound-eye device which makes it possible to easily obtain a distortion-free wide-angle capture image with a large picture angle in a direction perpendicular to the wide-angle direction without making it difficult to manufacture it or increasing its cost.

According to the present invention, this object is achieved by a wide-angle compound-eye imaging device comprising multiple optical lenses for collecting light entering therein in predetermined shared angular ranges in a direction from left to right in a wide-angle capture range (such direction being hereafter referred to as wide-angle direction) so as to form unit images for the respective angular ranges, the unit images being combined into a wide-angle capture image, wherein the wide-angle compound-eye imaging device further comprises an optical path modifying element placed on a light entrance side of the optical lenses for modifying path of the light in a direction perpendicular to the wide-angle direction so as to converge the light onto the optical lenses.

Due to the optical path modifying means placed on the light entrance side of the optical lenses, a distortion-free wide-angle capture image with a large picture angle in a direction perpendicular to the wide-angle direction can be easily obtained. In addition, since this wide-angle compound-eye imaging device does not require the use of a special lens such as a combined lens, it can be easily manufactured without increasing its cost.

Preferably, the multiple optical lenses comprise: left and right optical lenses placed on a line parallel to the wide-angle direction (such line being hereafter referred to as left-right direction line) for collecting light entering in left and right angular ranges in the capture range; and an optical lens (hereafter referred to as center optical lens) placed in a position vertically distant from the left and right optical lenses for collecting light entering in a center angular range in the capture range. The optical path modifying element is a toroidal lens comprising: a first curved surface having a curvature with a curvature axis parallel to the left-right direction line; and a second curved surface having a curvature with a curvature axis which is perpendicular to the left-right direction line and passes through the center optical lens. This makes it possible to obtain a distortion-free wide-angle capture image with a large picture angle in a direction perpendicular to the wide-angle direction even if the optical lenses are placed at apexes of a triangle.

Further preferably, the optical path modifying element is integrally assembled with a housing of the wide-angle compound-eye imaging device so as to serve as a protecting cover for the optical lenses. This makes it possible to achieve a compact design of the entire housing, and hence, of the entire wide-angle compound-eye imaging device.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
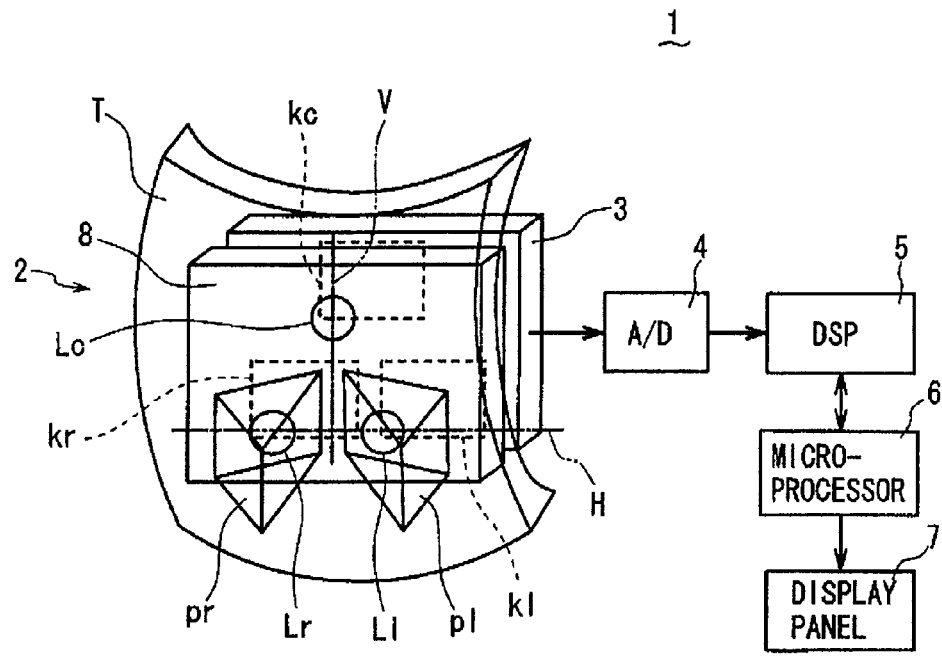
FIG. 1 is a schematic perspective view of a wide-angle compound-eye imaging device according to an embodiment of the present invention including an optical lens system.

Embodiments of the present invention, as best mode for carrying out the invention, will be described hereinafter with reference to the drawings. The present invention relates to a wide-angle compound-eye imaging device. It is to be understood that the embodiments described herein are not intended as limiting, or encompassing the entire scope of, the present invention. Note that like parts are designated by like reference numerals, characters or symbols throughout the drawings.

Figure 2:
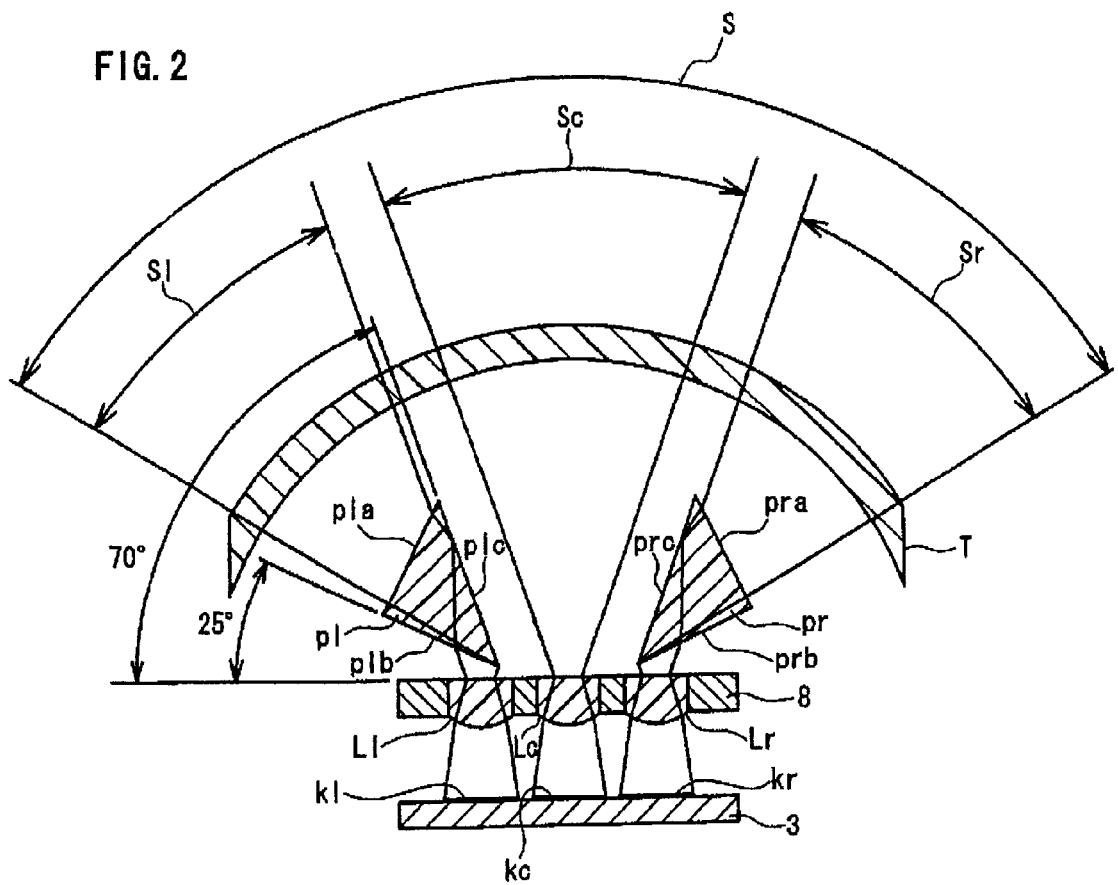
FIG. 2 is a schematic horizontal cross-sectional view of the optical lens system of the wide-angle compound-eye imaging device.

Referring to FIG. 1 to FIG. 11, a wide-angle compound-eye imaging device 1 according to an embodiment of the present invention will be described. FIG. 1 is a schematic perspective view of the wide-angle compound-eye imaging device 1 including an optical lens system 2 with a processing circuit, in block diagram form, for signal processing and display, while FIG. 2 is a schematic horizontal cross-sectional view of the optical lens system 2. As shown in FIG. 1 and FIG. 2, the optical lens system 2 of the wide-angle compound-eye imaging device 1 comprises multiple optical lenses (Ll, Lc and Lr described later) for collecting light entering therein in predetermined shared angular ranges in a capture range S of 120° (degrees), more specifically in angular ranges Sl, Sc and Sr, each of 40° (degrees), in the direction from left to right in the capture range S (such direction being hereafter referred to as wide-angle direction), so as to form unit images kl, kc and kr on a predetermined focal plane, respectively.

Figure 8:
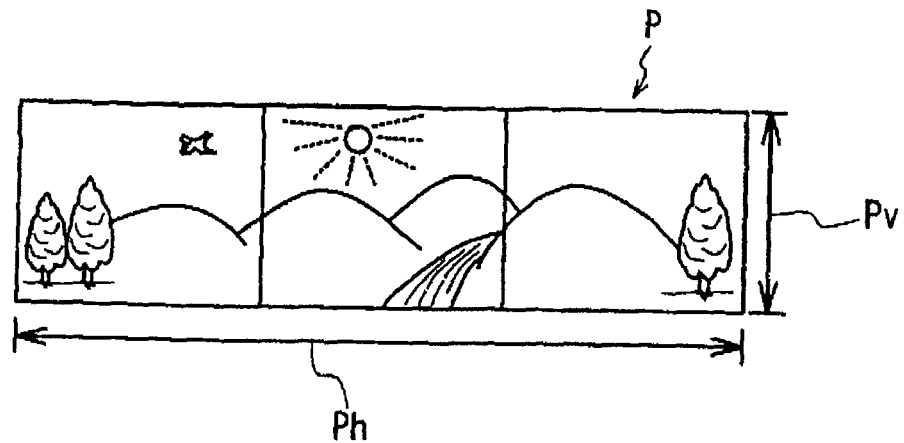
FIG. 8 is a schematic view showing a wide-angle capture image produced in the wide-angle compound-eye imaging device.

The wide-angle compound-eye imaging device 1 further comprises a solid-state imaging element (photodetector array) 3 for converting the unit images kl, kc and kr formed by the optical lens system 2 to electronic image information, and a processing circuit for signal processing and display. The processing circuit comprises: an A/D (Analog-to-Digital) converter 4 for converting the electronic image information from the solid-state imaging element 3 to a digital signal; a DSP (Digital Signal Processor) 5 controlled by a microprocessor 6 for subjecting the digital signal from the A/D converter 4 to image processing to produce image information, more specifically unit images kl, kc and kr; the microprocessor 6 for subjecting the unit images kl, kc and kr to image processing including combining the unit images kl, kc and kr into a wide-angle capture image P; and a display panel 7 such as a liquid crystal panel for displaying the produced wide-angle capture image P. FIG. 8 is a view showing such wide-angle capture image P produced in the wide-angle compound-eye imaging device 1.

The optical lens system 2 comprises: two optical lenses Ll and Lr (left and right optical lenses) placed in the wide-angle direction (direction of left-right direction line H shown in FIG. 1 connecting the centers of the optical lenses Ll and Lr); an optical lens Lc (center optical lens) placed in a position on an equidistant vertical line V between the optical lenses Ll and Lr, which position is distant from and above the left-right direction line H (and thus is vertically distant from the optical lenses Ll and Lr); two 45-45-90 degree right-angle prisms pl and pr placed in front of (on the light entrance side of) the two optical lenses Ll and Lr; and a toroidal lens T (optical path modifying element including a function of vertically modifying optical path) in front of (on the light entrance side of) the 45-45-90 degree right-angle prisms pl and pr. The optical lenses Ll, Lr and Lc are each formed of one lens and has a capture angle of 40° (degrees), and are supported in one plane by a lens holder 8.

As shown in FIG. 2, each of the 45-45-90 degree right-angle prisms pl and pr is placed such that light enters through each of outward sides pla and pra of the each two sides containing the right angle, and is reflected by each of hypotenuses plc and prc, and emitted through each of the other sides plb and prb of the right-angle prisms pl and pr. More specifically, as shown in FIG. 2, each of the right-angle prisms pl and pr is placed such that each of the sides plb and prb is inclined at an angle of 25° to each of the major planes of the left and right optical lenses Ll and Lr, while each of the hypotenuses plc and prc is inclined at an angle of 70° to a major surface of the lens holder 8. Based on the placement of the right-angle prisms pl and pr, light entering in the left and right angular ranges Sl and Sr of 40° enters, and is collected by, each of the left and right optical lenses Ll and Lr through the right-angle prisms pl and pr. On the other hand, light entering in the center angular range Sc of 40° directly enters, and is collected by, the center optical lens Lc without passing through a prism.

Figure 3A:
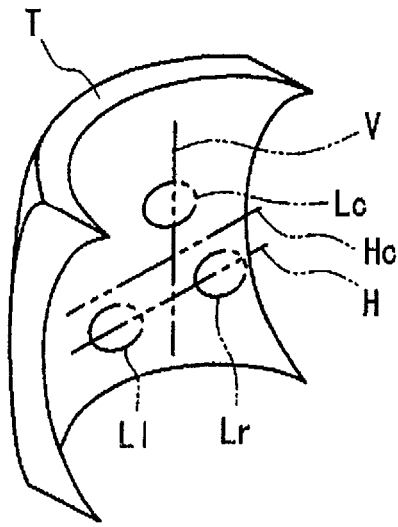
FIG. 3A and FIG. 3B are schematic perspective views of a toroidal lens of the wide-angle compound-eye imaging device as seen diagonally from behind and diagonally from front, respectively.
Figure 3B:
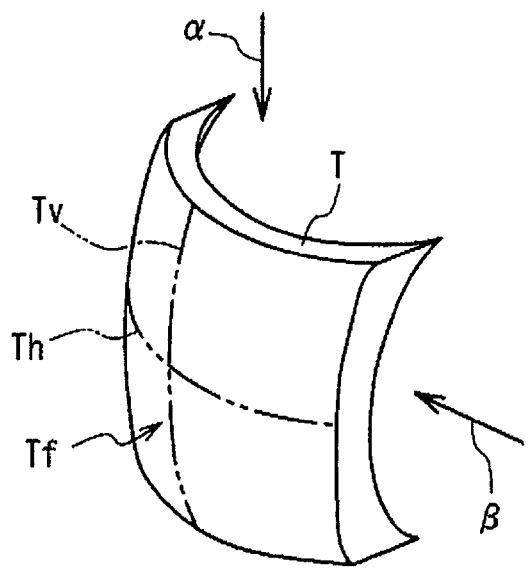
Figure 4:
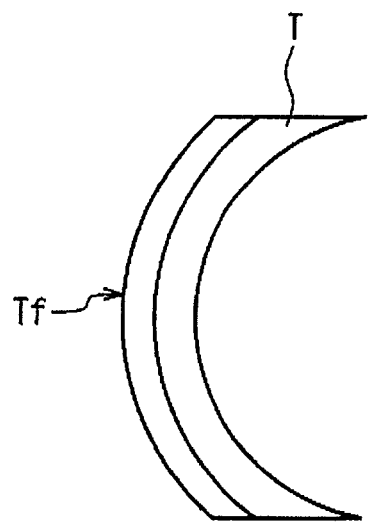
FIG. 4 is a schematic plan view of the toroidal lens as seen in a direction of arrow α in FIG. 3B.
Figure 5:
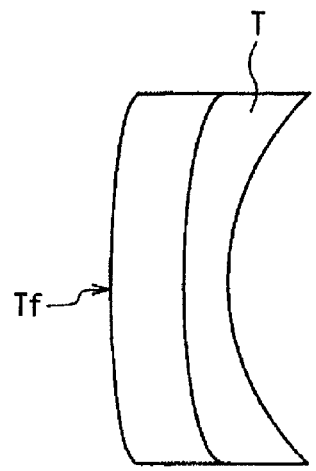
FIG. 5 is a schematic plan view of the toroidal lens as seen in a directions of arrow β in FIG. 3B.

Referring now to FIG. 3A to FIG. 6, the toroidal lens T will be described. FIG. 3A and FIG. 3B are schematic perspective views of the toroidal lens T of the wide-angle compound-eye imaging device 1 as seen diagonally from behind and diagonally from front, respectively. On the other hand, FIG. 4 and FIG. 5 are schematic plan views of the toroidal lens T as seen in directions of arrows α and β in FIG. 3B, respectively. As shown in FIG. 3A, FIG. 3B, FIG. 4 and FIG. 5, the toroidal lens T has a toroidal-shaped curved surface Tf formed by combining a vertically curved surface (first curved surface) having a curvature Tv and a horizontally curved surface (second curved surface) having a curvature Th. The toroidal lens T is placed such that the curvature axis of the first curved surface (Tv) coincides with a left-right direction line Hc which is parallel to the left-right direction line H connecting substantial centers of the left and right optical lenses Ll and Lr, and which passes through a substantial midpoint between the center optical lens Lc and the left/right optical lenses Ll/Lr, and that the curvature axis of the second curved surface (Th) coincides with a vertical line (equidistant vertical line V in FIG. 1) which is perpendicular to the left-right direction line H, and which passes through a substantial center of the center optical lens Lc (refer to FIG. 1 and FIG. 3A).

Figure 6:
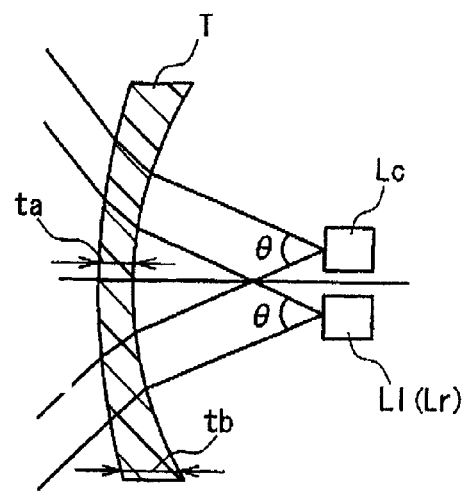
FIG. 6 is a schematic vertical cross-sectional view of the toroidal lens along a vertical line passing through a center between left and right ends of the toroidal lens.

FIG. 6 is a schematic vertical cross-sectional view of the toroidal lens T along a vertical line passing through a center between the left and right ends of the toroidal lens T. As shown in FIG. 6, the toroidal lens T has a thickness ta at the center of the cross-section and a thickness tb at an end of the cross-section, in which tb is larger than ta. Thus, the toroidal lens T has a function to vertically (i.e. in a direction perpendicular to the wide-angle direction) modify the optical path of light (or diverge light) entering in the capture range S so as to converge the light onto the center optical lens Lc and each of the left and right optical lenses Ll and Lr with a smaller convergence angle θ (i.e. capture range of each lens) than in the absence of the toroidal lens T. Note that the toroidal lens T in the present embodiment has a uniform thickness in its cross-section along a horizontal line passing through a center between the upper and lower ends of the toroidal lens T. However, the toroidal lens T can have a smaller thickness at the center and a larger thickness at an end of such cross-section along the horizontal line so as to have a function to horizontally modify the optical path (diverge light) to converge the entering light onto each optical lens with a smaller convergence angle than in the absence of the toroidal lens T.

Figure 7:
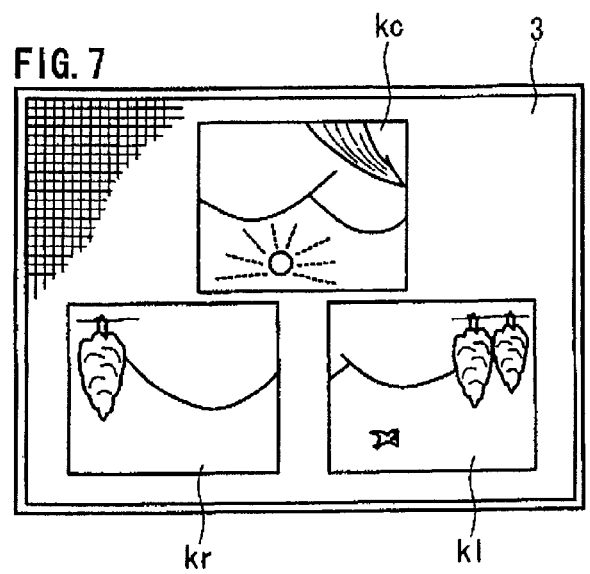
FIG. 7 is a schematic view showing an example of unit images formed on a solid-state imaging element of the wide-angle compound-eye imaging device.

Referring additionally to FIG. 7, the operation of the wide-angle compound-eye imaging device 1 of the present embodiment will be described. FIG. 7 is a schematic view showing an example of unit images kl, kc and kr formed on the solid-state imaging element 3. Now assume that the wide-angle compound-eye imaging device 1 operates to capture an image of light which enters in a capture range S of 120° or larger from left to right in the wide-angle direction and 45° or larger from up to down in the direction perpendicular to the wide-angle direction. Then, light entering in the center angular range Sc of 40° in the wide-angle direction passes through the toroidal lens T, and is collected by the center optical lens Lc, so as to form a center unit image kc on the solid-state imaging element 3 (refer to FIG. 2 and FIG. 7). The thus formed unit image kc on the solid-state imaging element 3 is inverted up/down and left/right from the original. On the other hand, light entering in the left and right angular ranges Sl and Sr of 40° passes through the toroidal lens T, and is bent and reflected by the 45-45-90 degree right-angle prisms pl and pr, and then is collected by the left and right optical lenses Ll and Lr so as to form left and right unit images kl and kr on the solid-state imaging element 3 (refer to FIG. 2 and FIG. 7). The thus formed unit image kl and kr on the solid-state imaging element 3 are inverted up/down from the original.

Here, the formed unit images kl, kc and kr are those based on light collected by the optical lenses Ll, Lc and Lr in the respective angular ranges Sl, Sc and Sr and in a vertical capture range or angle which can be larger (e.g. 45°) than the specific capture angle (convergence angle) (e.g. 40°) of each optical lens because the toroidal lens T has a function to vertically (or in a direction perpendicular to the wide-angle direction) modify the optical path of light (or diverge light) entering in the capture range S (i.e. to increase the vertical light entrance range in the capture range S from up to down in the direction perpendicular to the wide-angle direction). The unit images kl, kc and kr thus formed on the solid-state imaging element 3 are received by the DSP 5 as digital information, and are subjected to image processing by the DSP 5 and the microprocessor 6 to restore the up/down and/or left/right inverted unit images to normal unit images, and combine the restored unit images into a wide-angle capture image P to be displayed on the display panel 7 (refer to FIG. 8). In the present embodiment, it is assumed that the wide-angle capture image P has a horizontal picture angle Ph of about 120° and a vertical picture angle Pv of about 45°.

As described in the foregoing, the optical lenses Ll, Lc and Lr of the wide-angle compound-eye imaging device 1 of the present embodiment are placed in a special manner, more specifically in positions which can be said as apexes of a triangle as shown in FIG. 1 and FIG. 3A. The toroidal lens T having a function to vertically modify the optical path of light (or diverge light) is placed such that the curvature axis of the first curved surface (Tv) coincides with the left-right direction line Hc which is close and parallel to the left-right direction line H connecting substantial centers of the left and right optical lenses Ll and Lr, and that the curvature axis of the second curved surface (Th) substantially coincides with the vertical line V, so that the vertical picture angle of each of the unit images kl, kc and kr collected by the optical lenses Ll, Lc and Lr and formed by the solid-state imaging element 3 is vertically enlarged without causing distortion, making it possible to easily obtain a wide-angle capture image P which has a vertical picture angle Pv made larger than the specific capture angle of each of the optical lenses Ll, Lc and Lr.

Figure 9A:
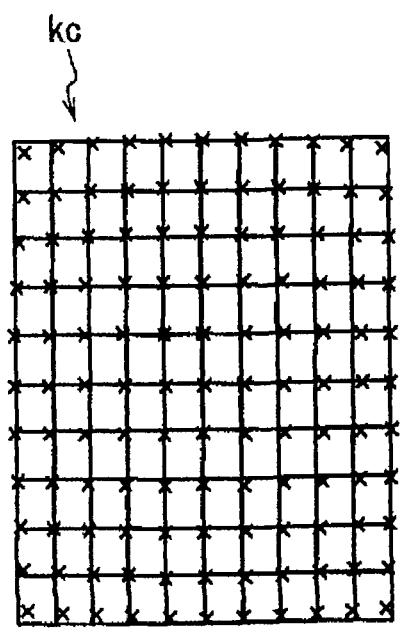
FIG. 9A and FIG. 9B are schematic views respectively showing pattern images of a center unit image and a left unit image captured and imaged by the wide-angle compound-eye imaging device.
Figure 9B:
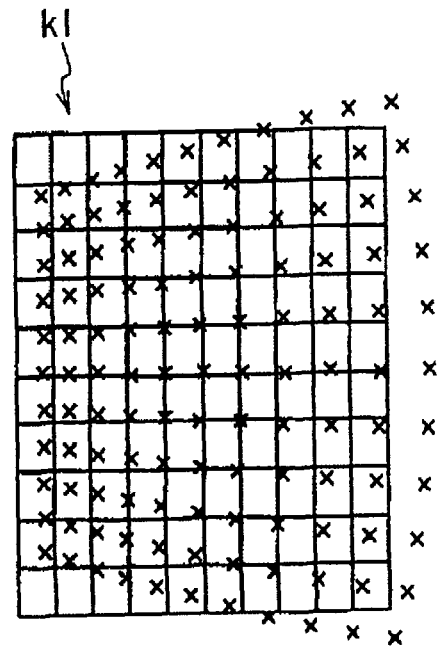
Figure 10A:
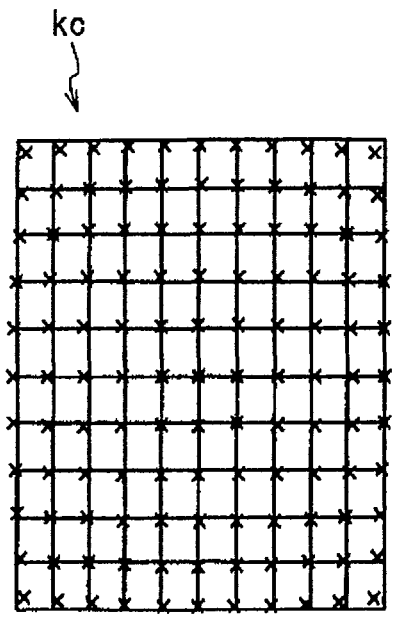
FIG. 10A and FIG. 10B are schematic views respectively showing pattern images of a center unit image and a left unit image captured and imaged by the same wide-angle compound-eye imaging device except that the toroidal lens is removed here for comparison.
Figure 10B:
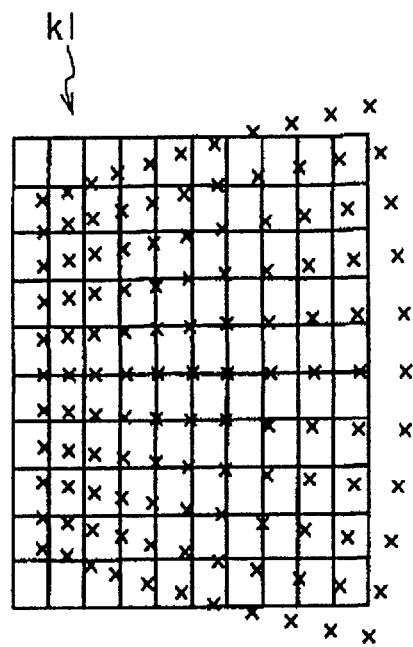

Referring to FIGS. 9A to 10B, it is shown that the toroidal lens T substantially does not cause another distortion. FIG. 9A and FIG. 9B are schematic views respectively showing pattern images of a center unit image kc and a left unit image kl captured and imaged by the wide-angle compound-eye imaging device 1 of the present embodiment, while FIG. 10A and FIG. 10B are those by the same wide-angle compound-eye imaging device except that the toroidal lens T is removed here for comparison. Comparisons between the pattern images of FIG. 9A and FIG. 10A and between the pattern images of FIG. 9B and FIG. 10B indicate that there is only a very small offset amount therebetween, making it apparent that substantially no image distortion is caused by the placement of the toroidal lens T on the light entrance side of the optical lenses Ll, Lc and Lr.

Figure 11:
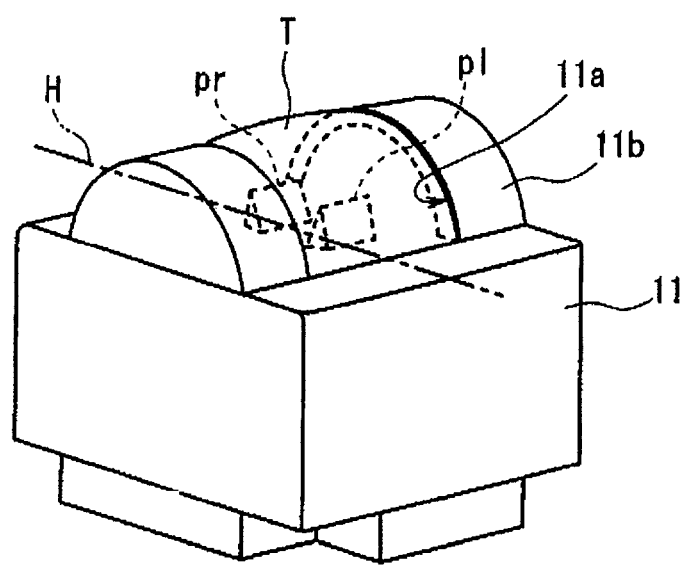
FIG. 11 is a schematic perspective view of a housing having the toroidal lens of the wide-angle compound-eye imaging device integrally assembled therewith.

FIG. 11 is a schematic perspective view of a housing 11 having the toroidal lens T of the wide-angle compound-eye imaging device 1 integrally assembled therewith. Since the toroidal lens T has a component of horizontally curved surface (second curved surface) with a curvature Th, the toroidal lens T can be easily assembled and fit to the housing 11 for accommodating the entire wide-angle compound-eye imaging device 1 as shown in FIG. 11. At the same time, the toroidal lens T on the housing 11 itself serves as (i.e. is used as) a protection cover for the optical lenses Ll, Lc and Lr and the 45-45-90 degree right-angle prisms pl and pr. More specifically, the housing 11 has a window opening 11a which openly faces a wide-angle capture range to allow the 45-45-90 degree right-angle prisms pl and pr to collect light entering in the wide-angle capture range (e.g. 180°) (e.g. in the wide-angle direction along the horizontal line H). This window opening 11a is advantageously formed in a tube portion 11b protruding from the housing 11 so as to achieve a compact design of the entire housing 11, and hence, of the entire wide-angle compound-eye imaging device 1. Further, by allowing the curvature of the tube portion 11b to coincide with the curvature Th of the toroidal lens T, the toroidal lens T can be fit to the window opening 11a without a gap therebetween. The toroidal lens T can prevent dust and moisture from entering the housing 11.

It is to be noted that the present invention is not limited to the above-described embodiments, and various modifications are possible. For example, the above embodiments show the case in which the optical lenses Ll, Lc and Lr are placed at apexes of a triangle as shown in FIG. 1 and FIG. 3A. However, the optical lenses Ll, Lc and Lr can be placed in a straight line.

More specifically, the center optical lens Lc can be placed on the left-right direction line H connecting the left and right optical lenses Ll and Lr. In this case, the curvature axis of the vertically curved surface (Tv) of the toroidal lens T coincides with the left-right direction line H connecting the three optical lenses Ll, Lc and Lr.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2008-056805 filed Mar. 6, 2008, the content of which is hereby incorporated by reference.

What is claimed is:

1. A wide-angle compound-eye imaging device comprising multiple optical lenses for collecting light entering therein in predetermined shared angular ranges in a wide-angle direction from left to right in a wide-angle capture range so as to form unit images for the respective angular ranges, the unit images being combined into a wide-angle capture image,
   wherein the wide-angle compound-eye imaging device further comprises an optical path modifying element placed on a light entrance side of the optical lenses for modifying path of the light in a direction perpendicular to the wide-angle direction so as to converge the light onto the optical lenses,
   wherein the multiple optical lenses comprise:
   only one left optical lens and only one right optical lens placed on a left-right direction line parallel to the wide-angle direction for collecting light entering in left and right angular ranges in the capture range; and
   a center optical lens placed in a position vertically distant from the left and right optical lenses for collecting light entering in a center angular range in the capture range, and
   wherein the optical path modifying element is a toroidal lens comprising:
   a first curved surface having a curvature with a curvature axis parallel to the left-right direction line; and
   a second curved surface having a curvature with a curvature axis which is perpendicular to the left-right direction line and passes through the center optical lens.

2. A wide-angle compound-eye imaging device comprising multiple optical lenses for collecting light entering therein in predetermined shared angular ranges in a wide-angle direction from left to right in a wide-angle capture range so as to form unit images for the respective angular ranges, the unit images being combined into a wide-angle capture image,
   wherein the wide-angle compound-eye imaging device further comprises an optical path modifying element placed on a light entrance side of the optical lenses for modifying path of the light in a direction perpendicular to the wide-angle direction so as to converge the light onto the optical lenses,
   wherein the multiple optical lenses comprise:
   left and right optical lenses placed on a left-right direction line parallel to the wide-angle direction for collecting light entering in left and right angular ranges in the capture range; and
   a center optical lens placed in a position vertically distant from the left and right optical lenses for collecting light entering in a center angular range in the capture range,
   wherein the optical path modifying element is a toroidal lens comprising:
   a first curved surface having a curvature with a curvature axis parallel to the left-right direction line; and
   a second curved surface having a curvature with a curvature axis which is perpendicular to the left-right direction line and passes through the center optical lens, and
   wherein the optical path modifying element is integrally assembled with a housing of the wide-angle compound-eye imaging device so as to serve as a protecting cover for the optical lenses.

3. A wide-angle compound-eye imaging device comprising multiple optical lenses for collecting light entering therein in predetermined shared angular ranges in a wide-angle direction from left to right in a wide-angle capture range so as to form unit images for the respective angular ranges, the unit images being combined into a wide-angle capture image,
   wherein the wide-angle compound-eye imaging device further comprises an optical path modifying element placed on a light entrance side of the optical lenses for modifying path of the light in a direction perpendicular to the wide-angle direction so as to converge the light onto the optical lenses, and
   wherein the optical path modifying element is integrally assembled with a housing of the wide-angle compound-eye imaging device so as to serve as a protecting cover for the optical lenses.

* * * * *